US012601505B2

(12) United States Patent
Lasobras Bernad et al.

(10) Patent No.: US 12,601,505 B2
(45) Date of Patent: Apr. 14, 2026

(54) FOOD PREPARATION APPARATUS AND METHOD FOR FOOD PREPARATION

(71) Applicant: BSH Hausgeräte GmbH, Munich (DE)

(72) Inventors: Javier Lasobras Bernad, Ejea de los Caballeros (ES); Sergio Llorente Gil, Saragossa (ES); Gonzalo Lopez Nicolas, Saragossa (ES); Carlos Sagües Blázquiz, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 627 days.

(21) Appl. No.: 17/927,377

(22) PCT Filed: Jun. 16, 2021

(86) PCT No.: PCT/EP2021/066200
§ 371 (c)(1),
(2) Date: Nov. 23, 2022

(87) PCT Pub. No.: WO2022/002589
PCT Pub. Date: Jan. 6, 2022

(65) Prior Publication Data
US 2023/0304674 A1 Sep. 28, 2023

(30) Foreign Application Priority Data
Jul. 1, 2020 (EP) .................................... 20382589

(51) Int. Cl.
*F24C 15/00* (2006.01)
*F24C 1/00* (2006.01)
(Continued)

(52) U.S. Cl.
CPC ............ *F24C 15/2021* (2013.01); *F24C 1/00* (2013.01); *G06T 7/90* (2017.01); *G06T 15/00* (2013.01);
(Continued)

(58) Field of Classification Search
None
See application file for complete search history.

(56) References Cited

U.S. PATENT DOCUMENTS

2013/0171304 A1* 7/2013 Huntley ................. G06Q 50/00
434/127
2018/0054573 A1* 2/2018 Handley ............... G01J 5/0022
(Continued)

OTHER PUBLICATIONS

International Search Report PCT/EP2021/066200 dated Sep. 6, 2021.

*Primary Examiner* — Ko-Wei Lin
(74) *Attorney, Agent, or Firm* — Michael E. Tschupp; Andre Pallapies; Brandon G. Braun

(57) ABSTRACT
A food preparation apparatus, in particular a cooktop apparatus, having a sensor unit which is provided in order to receive image data of a preparation region, having an additional sensor unit which is provided in order to receive additional image data of the preparation region and having a control unit for analyzing the image data. In order to increase user convenience and to achieve precise replication of a food preparation process, according to the invention the control unit is provided in order to also analyze, in at least one operating state, in addition to the image data formed as 3D image data, the additional image data in order to generate a digital twin of a situation in the preparation region, in particular of a food preparation process in the preparation region.

20 Claims, 2 Drawing Sheets

(51) Int. Cl.
    *F24C 15/20*      (2006.01)
    *G06T 7/90*       (2017.01)
    *G06T 15/00*     (2011.01)

(52) U.S. Cl.
    CPC .............. *G06T 2207/10024* (2013.01); *G06T 2207/10048* (2013.01)

(56)              References Cited

U.S. PATENT DOCUMENTS

| | | | |
|---|---|---|---|
| 2018/0100662 A1* | 4/2018 | Farahmand ........ | G05B 19/0428 |
| 2019/0003983 A1* | 1/2019 | Al-Omari ............. | G01N 25/72 |
| 2019/0174769 A1* | 6/2019 | Dingman ............. | G06T 19/006 |
| 2020/0217514 A1* | 7/2020 | Clayton ................. | F24C 7/085 |
| 2022/0021865 A1* | 1/2022 | Luckhardt ............ | F24C 15/006 |
| 2022/0024280 A1* | 1/2022 | Austin ............... | B60H 1/00807 |

\* cited by examiner

Storage Unit  26

24  Output Unit

18  Control Unit

22

12,16

10

20

20

14

| 100 | Recording image data and additional image data |
| 110 | Evaluating image data and additional image data |
| 120 | Output of digital twin |

FOOD PREPARATION APPARATUS AND METHOD FOR FOOD PREPARATION

CROSS-REFERENCES TO RELATED APPLICATIONS

This application is the U.S. National Stage of International Application No. PCT/EP2021/066200, filed Jun. 16, 2021, which designated the United States and has been published as International Publication No. WO 2022/002589 A1 and which claims the priority of European Patent Application, Serial No. 20382589.8, filed Jul. 1, 2020, pursuant to 35 U.S.C. 119(a)-(d).

The contents of International Application No. PCT/EP2021/066200 and European Patent Application, Serial No. 20382589.8 are incorporated herein by reference in their entireties as if fully set forth herein.

BACKGROUND OF THE INVENTION

The invention relates to a food preparation apparatus and a method for food preparation.

It is already known from the prior art to use RGB cameras to monitor a food preparation process.

BRIEF SUMMARY OF THE INVENTION

The object of the invention consists in particular in, but is not limited to, providing a generic apparatus with improved properties in terms of user convenience and precise reproduction of a food production process.

The invention is based on a food preparation apparatus, in particular a hob apparatus, with a sensor unit, which is provided for recording image data of a preparation region, with an additional sensor unit, which is provided for recording additional image data of the preparation region, and with a control unit for evaluating the image data.

In one aspect of the invention, it is proposed that the control unit is provided, in at least one operating state, in addition to the image data embodied as 3D image data, to also evaluate the additional image data to generate a digital twin of a situation in the preparation region, in particular of a food preparation process in the preparation region.

By way of an embodiment of this kind, it can be achieved that all the food preparation steps of the food preparation process, such as a cutting and/or mixing and/or stirring of foods and a boiling and/or cooking and/or steaming of foods, can be identified and tracked in a precise manner. Advantageously, the digital twin can be compared with a predefined food preparation process, in particular a recipe, and an incorrect performance of food preparation processes, for example a burning of foods and/or an incorrect proportioning of foods, can be avoided.

It would be conceivable that the food preparation apparatus could feature part, in particular a subassembly, of a hob. Alternatively, the food preparation apparatus could feature the entire hob. It would also be conceivable for the food preparation apparatus to feature part, in particular a subassembly, of an accessory part for the hob and/or for a countertop. The food preparation apparatus could possibly be freely movable, for example the sensor unit and the additional sensor unit could be part of a separate camera, which can be placed at any given position. The food preparation apparatus is preferably fixed at least in the operating state, for example the sensor unit and the additional sensor unit could be part of a camera integrated into a projector.

A "preparation region" is to be understood as meaning a three-dimensional region, in which at least one food preparation step of a food preparation process can be performed. In particular, the preparation region comprises a region above a part of a countertop and/or hob plate or above the entire countertop and/or hob plate. A "food preparation step" is to be understood as a procedure which is used to process foods, preferably with the aim of producing a dish from the foods. For example, the food preparation step could feature a cutting and/or mixing and/or stirring and/or boiling and/or turning and/or steaming and/or roasting of foods. A "food preparation process" is to be understood as meaning a process which features all the food preparation steps needed to produce the dish from foods, which in particular have not been processed. In particular, the food preparation process may be embodied as a recipe. For example, a food preparation process which is embodied as boiling noodles features a first food preparation step, which is embodied as filling a pot with cooking water and raw noodles, and a second food preparation step, which is embodied as boiling the raw noodles by heating the pot.

A "digital twin" is to be understood as meaning a digital reproduction of an object and/or process in the real world. In particular, the control unit is provided, in the operating state, to digitally reproduce the situation in the preparation region in real time. A "situation" is to be understood as meaning a state and/or procedure, for example the digital twin could be embodied as a reproduction of a state in the preparation region at a predefined point in time. The sensor unit and/or the additional sensor unit could possibly be provided, in the operating state, to record the image data and/or additional image data at a predefined point in time. Advantageously, the digital twin is embodied as a reproduction of at least one food preparation step taking place in the preparation region, particularly advantageously a sequence of food preparation steps taking place in the preparation region. In particular, the control unit is provided, in the operating state, to compare the digital twin with a predefined food preparation process, for example a recipe. The food preparation apparatus advantageously has a storage unit, in which recipes are stored. It would be possible for the control unit to be provided, in the operating state, to output an optical and/or acoustic warning signal to a user when the digital twin deviates from the predefined food preparation process. Particularly advantageously, the sensor unit and/or the additional sensor unit are provided, in the operating state, to record the image data and/or additional image data continuously and in particular in real time. For example, the digital twin could be embodied as a real-time reproduction of a stirring procedure, which embodies part of a cake baking process, wherein in the operating state the control unit evaluates the 3D image data and additional image data, in order to be able to track in real time, for example, how much butter, flour, sugar and how many eggs a user adds to a bowl.

"3D image data" is to be understood as meaning image data which assigns a spatial depth to at least one pixel. Preferably, the 3D image data assigns a spatial depth in each case to a large number of pixels, which in particular together form a contiguous image area. Advantageously, the spatial depth of the pixel is defined by a distance between a part of an object in the preparation region that corresponds to the pixel and the sensor unit. It would be conceivable for the sensor unit to have a plurality of stereoscopic sensors or further types of 3D sensors known to the person skilled in the art. Particularly advantageously, the sensor unit has an infrared depth sensor. An "infrared depth sensor" is to be understood as meaning a 3D sensor, which has an infrared transmitter, which is provided in the operating state to emit an infrared radiation, and an infrared receiver, which is provided in the operating state to receive a component of the infrared radiation that is reflected by the part of the object that corresponds to the pixel. In particular, the reflected component of the infrared radiation is part of the image data. Preferably, reflected components of the infrared radiation that are received at predefined spatial depths are stored in the storage unit. Particularly preferably, the control unit is provided, in the operating state, to ascertain a depth of the pixel by way of a comparison of the received reflected components of the infrared radiation with the stored reflected components of the infrared radiation.

It is further proposed that the sensor unit is provided to record a photo, in particular of the entire preparation region. It would be conceivable for the sensor unit to be provided for recording a black-and-white photo and to have a grayscale sensor, which is provided in the operating state to assign a grayscale value to each pixel of the photo. Preferably, the sensor unit is provided for recording a color photo and has a color sensor, which is provided in the operating state to assign a color value to each pixel of the photo. In particular, the color sensor is provided, in the operating state, to assign color coordinates of a given color space, for example the HSV color space or the CMYK color space or the RBG color space and preferably the Lab color space, to each pixel of the photo. "Color coordinates" are intended to be understood as meaning three-dimensional coordinates which represent a brightness and a color saturation as a point in the color space. In the case of the Lab color space, the color coordinates comprise a Z coordinate L*, which represents the brightness, an X coordinate a*, which represents a color value on a red-green color axis, and a Y coordinate b*, which represents a color value on a yellow-blue color axis. This makes it possible in particular to improve precision of the digital twin. Advantageously, shapes and/or colors of objects within the preparation region can be used to analyze the situation in the preparation region.

Particularly advantageously, the sensor unit is provided to record RGB-D image data of the preparation region. "RGB-D image data" is to be understood as meaning image data which assigns a color value and a spatial depth to the pixel. In particular, the sensor unit is embodied as an RGB-D camera. This makes it possible in particular to further improve precision of the digital twin. Advantageously, by combining color information and depth information, it is possible to distinguish between a hand of a user, an item of cookware and foods in a precise manner and to accurately track a movement of the same.

It would be conceivable for the additional sensor unit to have a capacitive sensor and for the additional image data to assign the pixel a parameter which states whether a hand of a user is located at the location of the pixel. In order to further increase precision of the digital twin, it is proposed that the additional sensor unit is provided for recording IR image data of the preparation region. In particular, the additional sensor unit has an IR sensor, for example a thermocouple. This makes it possible in particular to accurately track a temperature development within a food preparation step, for example a cooking procedure.

"Provided" is to be understood in particular as meaning specifically programmed, configured and/or equipped. The fact that an object is provided for a particular function is to be understood in particular as meaning that the object fulfills and/or carries out this particular function in at least one application and/or operating state.

It is additionally proposed that the control unit is provided, in the operating state, to output the digital twin to a user, in particular by means of an output unit of the food preparation apparatus. The control unit is preferably provided, in the operating state, to output the digital twin by means of an optical and/or acoustic signal. The output unit could for example have a display, in particular an LCD display and/or an OECD display. Alternatively or additionally, the output unit could have a lighting unit, in particular an LED, and/or a microphone. It would be conceivable for the control unit to be provided, in the operating state, to forward the digital twin, by means of a communication unit of the food preparation apparatus, to a further unit to output the digital twin. The communication unit could have a wireless transmitter and/or radio transmitter and/or IR transmitter and/or Bluetooth transmitter, for example. The further unit could be embodied, for example, as part of the hob and/or part of the extractor hood and/or part of an external unit, for example a mobile device, in particular a smartphone. This makes it possible in particular to increase user convenience. Advantageously, on the basis of the digital twin, a user is able to obtain an overview of the food processing steps previously performed.

Moreover, it is proposed that the control unit is provided, in the operating state, based on a result of the evaluation of the image data and additional image data, to output at least one proposal relating to a food preparation step to a user, in particular by means of the output unit. For example, the proposal could have an instruction to omit and/or repeat and/or perform and/or terminate and/or revise the food preparation step. Advantageously, the control unit is provided, in the operating state, to propose to the user, after performing a food preparation step of a predefined food preparation process, to perform a further food preparation step following the food preparation step in the predefined food preparation process. Furthermore, the control unit could be provided, in the operating state, to propose to the user to terminate the food preparation step after starting a food preparation step, after a predefined time and/or after reaching a predefined temperature and/or after reaching a predefined coloration. This makes it possible in particular to further increase user convenience. Advantageously, an incorrect performing of the predefined food preparation process can be avoided. Particularly advantageously, the food preparation apparatus can guide the user through the predefined food process.

In order to increase user convenience and flexibility, it is proposed that the control unit is provided, in the operating state, based on a result of the evaluation of the image data and additional image data, to adapt at least one food preparation parameter of a food preparation process, in particular of a predefined food preparation process. The food preparation parameter may be a time, a temperature, a size, a weight and/or a number, for example. For example, the control unit could be provided, in the operating state, when an amount of a food used for the food preparation process increases, to equally increase amounts of all the other foods used for the food preparation process and preferably to indicate this to the user as a proposal. Advantageously, the control unit may be provided, in the operating state, when using a new food which has not been part of the food preparation process until now, to expand the food preparation process with food preparation steps which are used to prepare the new food, and preferably to propose to the user to perform the food preparation steps. This makes it possible to achieve a supporting of individual food preparation processes by way of the food preparation apparatus. Advantageously, it is possible for recipes to be adapted to a respective number of necessary portions and/or to personal food preferences of the user. Particularly advantageously, the food preparation apparatus is also able to prevent incorrect performing of the food preparation process when the food preparation process is spontaneously changed.

In a further aspect the invention, which can be considered alone per se or also in combination with further aspects of the invention, it is proposed that the control unit is provided, in at least one operating state, in particular the operating state, to evaluate the image data to determine a degree of emissions of at least one object in the preparation region. Advantageously, the control unit is provided, in the operating state, to evaluate the ascertained degree of emissions together with the IR image data to form a temperature measurement. This makes it possible for a temperature measurement of the object in the preparation region to be advantageously improved, wherein in particular it is possible to dispense with additional components for determining the degree of emissions. Alternatively, it would be conceivable for the food preparation apparatus to have an additional component for determining the degree of emissions of at least one object in the preparation region.

Advantageously, the determining of the degree of emissions comprises determining a color value on the basis of the photo. It would be conceivable for the color value to be embodied as a brightness value and the photo to be embodied as a black-and-white photo. Advantageously, the color value is embodied as a sum of the color coordinates and the photo is embodied as a color photo. Particularly advantageously, predefined color values and predefined degrees of emissions corresponding to the predefined color values are stored in the storage unit. The control unit could possibly be provided to compare the color value with the predefined color values and, if it matches a predefined color value, to assign the object the predefined degree of emissions corresponding to the predefined color value. For example, the color value could be identical to a predefined color value, which identifies the object as a cooking pot made of stainless steel, whereupon the control unit assigns the object a predefined degree of emission of a cooking pot made of stainless steel. This makes it possible to provide the determining of the degree of emission in a simple manner.

In order to further simplify the determining of the degree of emission, it is proposed that the control unit is provided to assign the color value to a predefined color value range, wherein the predefined color value range is assigned a predefined degree of emission. In particular, an overall color value range, which has all possible color values, comprises at least two predefined color value ranges, preferably the color value ranges together embody the overall color value range. Advantageously, the color value ranges are embodied such that they do not overlap one another. Particularly advantageously, at least one of the color value ranges is assigned to a predefined type of object, wherein the control unit is provided to identify an object, which has a color value in the color value range, as belonging to the predefined type of objects. Preferably, the control unit is provided to assign a predefined degree of emissions to all objects which are identified as belonging to the predefined type of objects. In particular, the predefined type of object is embodied as a type of cookware. Particularly advantageously, the control unit is provided to assign the color value to one of two predefined color value ranges, which together embody the overall color value range. For example, in the event that the object is an item of cookware, the two predefined color value ranges could be used to roughly distinguish between coated cookware and metallic cookware. This makes it possible to also correctly assign the degree of emissions in relation to the color value of objects that differ slightly from one another. Advantageously, it is possible to dispense with a precise ascertaining of the color value. Particularly advantageously, it is possible to distinguish between types of objects, wherein the degree of emissions of objects of the type do not differ from one another greatly, and this achieves a sufficiently accurate ascertaining of the degree of emissions.

Furthermore, a kitchen appliance, in particular an extractor hood, is proposed, with the food preparation apparatus. This makes it possible, in a simple manner, to increase user convenience and precisely generate a digital twin of the food production process. Advantageously, additional installation steps for installing the food preparation apparatus in a surrounding area of the preparation region are dispensed with.

Furthermore, a method for food preparation is taken as a starting point, in particular with the food preparation apparatus, in which image data and additional image data of a preparation region are recorded.

It is proposed that the image data embodied as 3D image data and the additional image data are evaluated to generate a digital twin of a situation in the preparation region, in particular of a food preparation process in the preparation region. This makes it possible to increase user convenience and precisely generate a digital twin of the food production process. Advantageously, it is possible to avoid an incorrect performance of food preparation processes.

In this context, the food preparation apparatus is not intended to be restricted to the application and embodiment described above. In particular, in order to fulfil a mode of operation described in this text, the food preparation apparatus may have a number of individual elements, components and units deviating from the number mentioned here.

Further advantages result from the following description of the drawings. The drawings show an exemplary embodiment of the invention. The drawings, the description and the claims contain numerous features in combination. The person skilled in the art will expediently also consider the features individually and combine them to form useful further combinations.

DETAILED DESCRIPTION OF EXEMPLARY EMBODIMENTS OF THE PRESENT INVENTION

Figure 1:
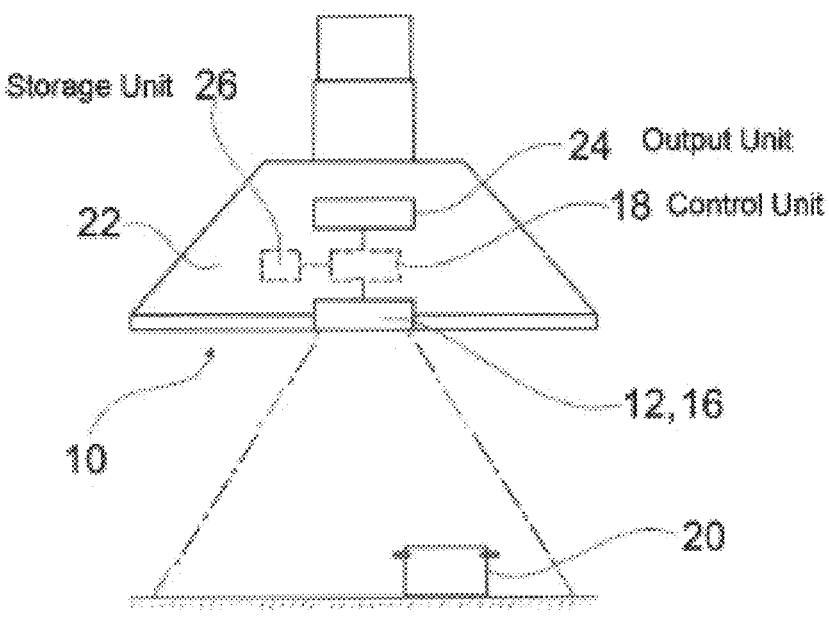
FIG. 1 shows a kitchen appliance with a food preparation apparatus in a front view.

Only one of the objects present multiple times in the figures is provided with a reference character in each case.

FIG. 1 shows a kitchen appliance 22. The kitchen appliance 22 is embodied as an extractor hood. The kitchen appliance 22 has a food preparations apparatus 10. Alternatively, the food preparation apparatus 10 could be embodied as part of a hob or as a separate accessory part. The food preparation apparatus 10 is embodied as a hob apparatus. Alternatively or additionally, the food preparation apparatus 10 could be embodied as a countertop apparatus.

Figure 2:
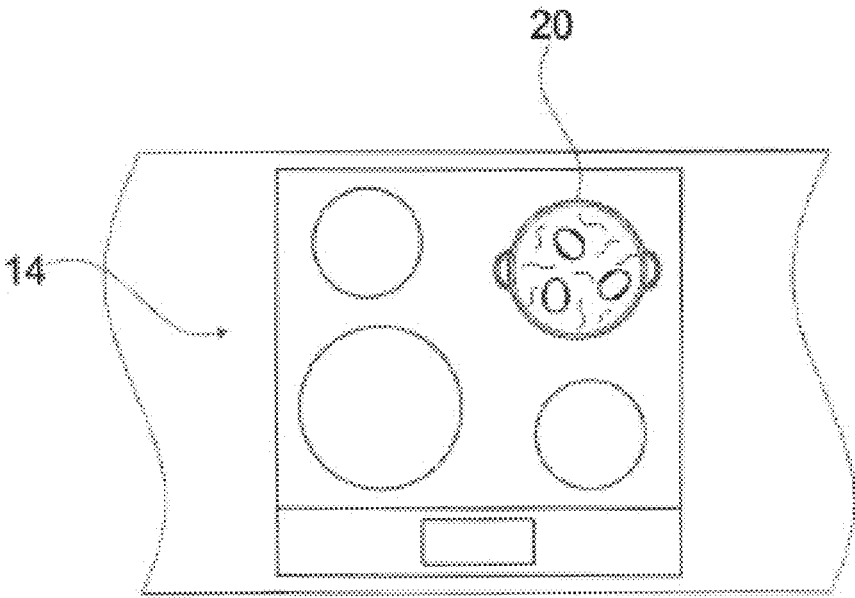
FIG. 2 shows a photo recorded by the food preparation apparatus.

The food preparation apparatus 10 has a sensor unit 12. The sensor unit 12 records image data of a preparation region 14. The sensor unit 12 records a photo of the preparation region 14, which is shown in FIG. 2. The photo is embodied as a color photo. Alternatively, the photo could be embodied as a black-and-white photo. The image data is embodied as 3D image data. The sensor unit 12 records RGB-D image data of the preparation region 14. The sensor unit 12 has an RGB sensor (not shown). The sensor unit 12 has an infrared depth sensor (not shown). The sensor unit 12 is embodied as an RGB-D camera.

The food preparation apparatus 10 has an additional sensor unit 16. The additional sensor unit 16 records additional image data of the preparation region 14. The additional sensor unit 16 records IR image data of the preparation region 14. The additional sensor unit 16 is embodied as an IR camera. The sensor unit 12 and the additional sensor unit 16 together form a camera unit that is integrated into the kitchen appliance 22.

The preparation region 14 is embodied as a hob. Alternatively or additionally, the preparation region 14 could be embodied as part of a countertop. An object 20 is arranged in the preparation region 14. The object 20 is embodied as a cooking pot. Cooking water and three eggs are located in the cooking pot.

Figure 3:
FIG. 3 shows an output unit of the food preparation apparatus, which outputs a digital twin of a food preparation process.

The food preparation apparatus 10 has a control unit 18. The control unit 18 is embodied as a processor. The control unit 18 evaluates the image data and the additional image data to generate a digital twin of a situation in the preparation region 14. The control unit 18 evaluates the image data and the additional image data to ascertain food preparation parameters, which together embody the digital twin. The control unit 18 evaluates the image data to ascertain a size, shape, number, color and movement of objects in the cooking region 14. The control unit 18 evaluates the additional image data to ascertain a temperature of objects in the preparation region 14. The control unit 18 outputs the digital twin to a user via an output unit 24 of the kitchen appliance 22, which is shown in FIG. 3. Alternatively, the control unit 18 could output the digital twin to the user via an output unit of a hob or an external unit. The output unit 24 is embodied as an LCD display.

The situation in the preparation region 14 is embodied as part of a food preparation process. The food preparation process is embodied as boiling eggs. The control unit 18 outputs the digital twin via the output unit 24 as a number of eggs, an amount of cooking water, a set heating power level and a cooking time until now. Alternatively, the situation could be embodied as part of any given other food preparation process, such as roasting, cooking, mixing etc. for example, and the digital twin could be output in the form of any given food preparation parameters, such as a browning, a weight, a volume, a stirring duration, a roasting duration etc. for example.

Figure 4:
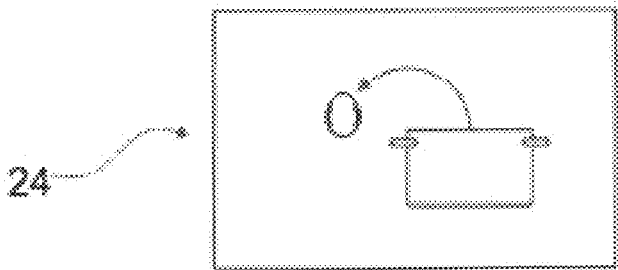
FIG. 4 shows the output unit, which outputs a proposal relating to a food preparation step

The control unit 18 outputs to the user, based on a result of the evaluation of the image data and additional image data, a proposal relating to a food preparation step via the output unit 24, which is shown in FIG. 4. The food preparation apparatus 10 has a storage unit 26. The storage unit 26 is embodied as a common storage medium, for example a memory card. Stored in the storage unit 26 are predefined cooking times for boiling eggs as a function of food preparation parameters. The control unit 18 ascertains, on the basis of the ascertained food preparation parameters and the predefined cooking times stored in the storage unit 26, a predefined cooking time corresponding to the situation in the preparation region 14. Once the predefined cooking time has elapsed, the control unit 18 outputs to the user the proposal, to remove the eggs from the cooking pot. Alternatively or additionally, recipes, for example a cake recipe, could be stored in the storage unit 26, wherein the control unit 18 tracks individual food preparation steps of the recipe based on the result of the evaluation of the image data and additional image data and proposes to the user the next food preparation step according to the recipe in each case.

Based on the result of the evaluation of the image data and additional image data, the control unit 18 adapts a food preparation parameter of a food preparation process. If the result of the evaluation of the image data and additional image data is that the user has modified a food preparation parameter shown in FIG. 2, then the control unit 18 re-ascertains the predefined cooking time and adapts it to the new situation in the preparation region 14. Alternatively, the control unit 18 could adapt a recipe stored in the storage unit 26 based on the result of the evaluation of the image data and additional image data, for example, in the absence of horseradish in the preparation region 14, the control unit 18 could identify that the user wishes to omit horseradish, and adapt a salad recipe being used, so that it no longer includes horseradish.

The control unit 18 evaluates the image data to determine a degree of emissions of the object 20 in the preparation region 14. The determining of the degree of emissions comprises determining a color value on the basis of the photo. The color value is embodied as a sum of color coordinates L*, a* and b* in a Lab color space. The control unit 18 assigns the color value to one of two predefined color value ranges. The two predefined color value ranges do not overlap one another. Together, the two predefined color value ranges embody an overall color value range. A predefined first color value range is assigned a predefined first degree of emissions. The predefined first color value range is assigned to a first type of object. The first type of object is embodied as metallic cookware. The first type of object is assigned a predefined first degree of emissions. The predefined first degree of emissions corresponds to a common degree of emissions for metallic cookware known to the person skilled in the art. A predefined second color value range is assigned a predefined second degree of emissions. The predefined second color value range is assigned to a second type of object. The second type of object is embodied as coated cookware. The predefined second degree of emissions corresponds to a common degree of emissions for coated cookware known to the person skilled in the art. The determining of a degree of emissions is used to roughly distinguish between metallic cookware arranged in the preparation region 14 and coated cookware arranged in the preparation region 14. The control unit 18 identifies the object 20 as an item of metallic cookware on the basis of the determining of the color value. The control unit 18 uses the IR image data and the predefined first degree of emissions to determine the temperature of the object 20.

Figure 5:
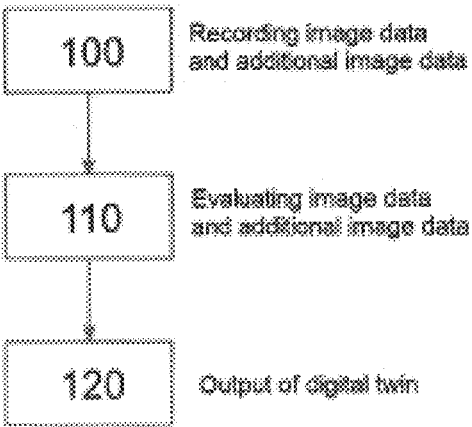
FIG. 5 shows a schematic flow diagram of a method for food preparation with the food preparation apparatus.

In FIG. 5, a schematic flow diagram of a method for food preparation with the food preparation apparatus 10 is shown. In a recording step 100, the image data and the additional image data of the preparation region 14 are recorded by the sensor unit 12 and the additional sensor unit 16. In an evaluation step 110, the image data and the additional image data are evaluated by the control unit 18 to generate the digital twin. The evaluation step 110 follows the recording step 100. In an output step 120, the control unit 18 outputs the digital twin to the user via the output unit 24. The output step 120 follows the evaluation step 110.

The invention claimed is:

1. A food preparation apparatus, comprising:
   a sensor unit configured to record three-dimensional (3D) image data of a preparation region;
   an additional sensor unit configured to record infrared (IR) image data comprising a spatially resolved thermal image of the preparation region; and
   a control unit configured to evaluate the 3D image data and the IR image data to generate a digital twin of a situation in the preparation region.

2. The food preparation apparatus of claim 1, wherein the preparation region is defined by a hob.

3. The food preparation apparatus of claim 1, wherein the control unit generates the digital twin of a food preparation process in the preparation region.

4. The food preparation apparatus of claim 1, wherein the control unit is further configured to output the digital twin to a user.

5. The food preparation apparatus of claim 1, wherein the control unit is further configured to output to a user a proposal relating to a food preparation process responsive to a result of the evaluation of the 3D image data and the IR image data.

6. The food preparation apparatus of claim 1, wherein the control unit is further configured to adapt a food preparation parameter of a food preparation process, responsive to a result of the evaluation of the 3D image data and the IR image data.

7. The food preparation apparatus of claim 1, wherein the sensor unit includes a color sensor, wherein the control unit is configured to evaluate the 3D image data to determine a thermal emissivity of an object in the preparation region.

8. The food preparation apparatus of claim 7, wherein the control unit determines the thermal emissivity of the object in the preparation region by assigning a color value to the object based on the 3D image data, wherein the color value corresponds to a predefined color value range, wherein the predefined color value range corresponds to a predefined degree of thermal emissions.

9. The food preparation apparatus of claim 8, wherein the control unit is further configured to evaluate the predefined degree of thermal emissions and the IR image data of the object in the preparation region to assign a temperature to the object.

10. The food preparation apparatus of claim 8, wherein the color value is defined by a sum of color coordinates.

11. The food preparation apparatus of claim 10, wherein the color coordinates include L*, a*, and b* in a Lab color space.

12. The food preparation apparatus of claim 1, wherein the sensor unit comprises a RGB-D camera configured to record the 3D image data of the preparation region.

13. A kitchen appliance, comprising the food preparation apparatus of claim 1.

14. The kitchen appliance of claim 13, wherein the control unit is further configured to output to a user a proposal relating to a food preparation process, responsive to a result of the evaluation of the 3D image data and the IR image data.

15. An extractor hood, comprising the food preparation apparatus of claim 1.

16. The food preparation apparatus of claim 1, wherein the additional sensor unit comprises an IR camera configured to record the IR image data of the preparation region.

17. The food preparation apparatus of claim 1, wherein the additional sensor unit comprises a capacitive sensor configured to detect an object in the preparation region.

18. A method for food preparation, the method comprising:
   recording three-dimensional (3D) image data, and infrared (IR) image data comprising a spatially resolved thermal image of a preparation region; and
   evaluating the 3D image data and the IR image data to generate a digital twin of a situation in the preparation region.

19. The method of claim 18, wherein the digital twin comprises a food preparation process in the preparation region.

20. The method of claim 18, further comprising:
   outputting the digital twin to a user; and
   outputting to the user a proposal relating to a food preparation process.

* * * * *